United States Patent [19]

Haruki et al.

[11] Patent Number: 4,606,630
[45] Date of Patent: Aug. 19, 1986

[54] RANGEFINDER

[75] Inventors: Hiromu Haruki, Yokohama; Shotaro Yokoyama; Takashi Nishibe, both of Yokosuka, all of Japan

[73] Assignees: Fuji Electric Corporate Research and Development Co., Ltd.; Fuji Electric Company, Ltd., both of Japan

[21] Appl. No.: 629,318

[22] Filed: Jul. 10, 1984

[30] Foreign Application Priority Data

Jul. 14, 1983 [JP] Japan ................................ 58-128452

[51] Int. Cl.$^4$ .......................... G03B 3/00; G01C 3/00
[52] U.S. Cl. ........................................ 356/1; 354/408
[58] Field of Search ............................ 356/1; 250/201; 354/400, 402, 404, 405, 406, 408

[56] References Cited

U.S. PATENT DOCUMENTS

| | | | |
|---|---|---|---|
| 4,178,098 | 12/1979 | Asano et al. | 354/408 |
| 4,189,232 | 2/1980 | Asano et al. | 356/1 |
| 4,341,447 | 7/1982 | Biber | 354/408 |
| 4,405,220 | 9/1983 | Kusaka et al. | 354/402 |
| 4,423,935 | 1/1984 | Eguchi et al. | 354/402 |
| 4,506,150 | 3/1985 | Ogasawara | 354/402 |

*Primary Examiner*—Russell E. Adams
*Attorney, Agent, or Firm*—Brumbaugh, Graves, Donohue & Raymond

[57] ABSTRACT

In the embodiment disclosed in the specification, a rangefinder comprises left and right sensor arrays for receiving the light of an image of an object, evaluative signal generating circuits for defining the interrelation between left and right image data trains representing the distribution of light intensity within the object, an optimum shift value decision circuit for determining the shift number in the image data train corresponding to the highest correlation between both the image data trains, a range signal computing circuit for computing a range signal representing the distance up to the object from the optimum shifted number, and a control circuit for controlling and regulating a predetermined portion in equipment utilizing the range signal. The evaluative signal generating circuits are arranged to generate the evaluative signals simultaneously and transmit them in parallel to the shift value circuit defining the correlation between the left and right image data trains. The evaluative signal generating circuits and the optimum shift value decision circuit are contained in a first circuit device, whereas the control circuit means are contained in a second circuit device. The first circuit device starts rangefinding operation on receiving instructions from the second circuit device and transmits the range signal to the second circuit device after determining the optimum shifted number.

7 Claims, 5 Drawing Figures

RANGEFINDER

BACKGROUND OF THE INVENTION

This invention relates to rangefinders for optical apparatus such as a camera and, more particularly, to rangefinders which measure the distance to an object by means of a pair of optical sensor arrays and a combination of electronic circuits.

Rangefinders using optical sensor arrays have been known for a long time and recently completely electronic rangefinders without any moving parts have appeared. Such electronic rangefinders are highly regarded because they are compact, inexpensive and accurate. However, the presently available electronic rangefinders require too much time for most rangefinding purposes and therefore they have not been widely used.

A diagram illustrative of the principle of the operation of a conventional rangefinder is shown in FIG. 1. In that diagram, light from an object 1 is incident on two small lenses 2 and 3 which have a sufficiently short focal length f that light rays received from the object through different spaced paths 4 and 5 produce corresponding spaced images 7 and 8 in a focal plane 6 which is common to the lenses 2 and 3. When the object 1 is at an infinite distance, the centers of the images 7 and 8 are located at reference positions 70 and 80 in FIG. 1, but when the object 1 is located at a closer distance, the centers of the images are shifted apart to positions 71 and 81. If the distance by which the images 7 and 8 are shifted from the reference positions 70 and 80 are designated $x_1$ and $x_2$, respectively, then the total shift x may be expressed as follows:

$$x = x_1 + x_2 = b \cdot f / d \tag{1}$$

Thus, the distance d to the object 1 can be measured by $d = b \cdot f / x$. In this case, b is the distance between the optical axes of the small lenses, that is, the base length.

To obtain the shifted amounts $x_1$ and $x_2$, or the sum x of both, two optical sensor arrays 10 and 11 are provided in the focal plane 6 as shown in FIG. 1. These optical sensor arrays each comprise a plurality of optical sensors, for instance CCD devices, and an analog photoelectric signal is generated by each optical sensor corresponding to the light intensity at the portion of the image which is incident on the sensor. Each analog signal is converted into a "0" or "1" digital signal by a device for quantifying the analog signal, for instance, an analog/digital converter. FIG. 2 shows a typical circuit for obtaining the sum x of the shifted distances by comparing two image signal trains comprising the digital image signals from the left and right optical sensor arrays. The circuit includes two shift registers 12 and 13 and the output signals from the optical sensor arrays 10 and 11 of FIG. 1 are quantified into digital image signals by the analog/digital converter and stored in these shift registers in the same order as the arrangement of the optical sensors in the optical sensor arrays.

When the above-described image signals are written into the shift registers 12 and 13, shift signals are applied from a timing control unit 14 to the control terminals of the shift registers 12 and 13 and the image signals that have been stored in each of the shift registers 12 and 13 are shifted one stage at a time in synchronism and successively produced at the shift register output terminals OUT. The output signals from the shift registers 12 and 13 are respectively returned to the corresponding input terminals IN and again entered in sequence into the shift registers. An exclusive NOR circuit 15 generates a "1" when the outputs of the shift registers 12 and 13 coincide with each other and a "0" when the outputs do not coincide. A coincidence counter 16 counts the number of times the output of the exclusive NOR circuit is "1" during the time when the image data signals are produced successively by the shift registers 12 and 13.

Assuming that the number of optical sensors in the optical sensor arrays 10 and 11 shown in FIG. 1 are m and n, respectively, and that m and n pieces of image data are stored in the shift registers 12 and 13 with $m < n$, if the signals are shifted m times by the shift registers 12 and 13 there is a comparison of all of the data stored in the shift register 12 with the first m pieces of data stored in the shift register 13. During this comparison, the counter 16 counts the number of bits which coincide when the image data stored in the shift registers 12 and 13 have not been shifted with respect to each other. When this comparison has been completed, the signals in the shift register 12 have been returned to the initial positions, whereas the signals in the shift register 13 have been shifted m positions to the right. At this point, the contents of the coincidence counter 16 are stored in a maximum coincidence number memory 17. Then the signals in the shift register 13 are shifted by $(n - m + 1)$ positions under the command of the timing control unit 14 and the counter 16 is cleared. As a result, the contents of the shift register 13 are located one position to the right as compared with their initial condition. A shift counter 18, which counts the number of positions the signals in the register 13 have been shifted to the right as compared with the initial condition, is incremented each time the comparison of data in the shift registers has been completed.

The second comparison is made by shifting the data in the shift registers 12 and 13 successively to the right m times. When the second comparison has been completed, the contents $C_1$ of the counter 16 and the contents $C_2$ of the maximum coincidence number memory 17 are compared by a comparator 19 to determine which is larger. If $C_1 > C_2$, $C_1$ is transferred to the maximum coincidence number memory 17. At the same time, the contents $S_1$ of the shift counter 18 are written to a shift memory 20. Then the shift register 13 is again shifted by $(n - m + 1)$ positions to the right as in the preceding case and the counter 16 is cleared.

This is followed by the comparisons of the stored contents of the shift registers 12 and 13 and of contents of the counter 16 and the maximum coincidence number memory 17; rewriting of the maximum coincidence number memory 17 and the shift memory 20 based on the results obtained; shifting of the shift register 13 $(n - m + 1)$ times; and clearance of the counter 16. When the repetition is completed, the number stored in the maximum coincidence number memory 17 is the maximum coincidence number resulted from successive examination of the degree of coincidence between the contents of the shift register 12 and part of the contents of the shift register 13. In the shift memory 20, on the other hand, the shift number between the shift registers 12 and 13 which provides the maximum coincidence corresponding to the difference in the signal positions is stored. This shift number corresponds to the total image shift x. The timing control unit 18 then latches the contents of the shift memory 20 in an output latch as the final step of the operation and causes the latch to produce a range signal.

In the above-described prior art comparator for comparing image data in a rangefinder, the disadvantage is that a long time is unavoidably required to compare image data because the maximum coincidence point between two image data trains must be determined by repeatedly circulating the contents of the shift registers 12 and 13 while changing the relative shift number.

Since such a long time is needed to compare image data and thus to determine the distance to an object, when photographs are taken with a video camera, for instance, while the visual fields are moving, the images that are photographed may be out of focus since the rangefinder has focused on visual fields other than the one being taken. Moreover, such rangefinders require circuits for determining the distance d from the quantity x according to the equation (1) and for bringing an object into focus based on the quantity x, as well as circuits suited to the characteristics of optical equipment for controlling and regulating other parts of the optical equipment in which the rangefinder has been incorporated, for instance, diaphragms and shutters in the case of cameras. It is, needless to say, most desirable to integrate a rangefinder with computing, control and regulating circuits, or build them into a custom integrated circuit. However, because the functions required for such integrated circuits will vary according to the specific optical equipment, it is difficult to design an integrated circuit which can deal with each of such requirements and such an effort would also be uneconomical. On the other hand, because preparation of software that meets such functional requirements will be easy if a microcomputer is used, this choice is obviously advantageous. However, the short time permitted for rangefinding as a practical matter makes such a choice inappropriate.

Accordingly, it is an object of the present invention to eliminate the shortcomings and incompatibilities inherent in the prior art rangefinders and to provide a rangefinder having a short rangefinding time which is capable of readily meeting requirements peculiar to different applications.

SUMMARY OF THE INVENTION

In accordance with the present invention, a plurality of evaluative signals indicating the degree of the interrelation between the image signal trains from left and right optical sensors are generated in parallel by evaluative signal generating circuits. These evaluative signals are generated at intervals of shifted numbers that should define the interrelation between the left and right image signal trains and are temporarily stored. Subsequently, an optimum shift value decision circuit determines the optimum shift number corresponding to the highest correlation between the left and right image signal trains among the plurality of evaluative signals. In this way, the rangefinding time is greatly shortened. In other words, if the number of range divisions or bands that should be distinguished by the rangefinder is S, the number of shifts for defining the interrelation between the left and right image signal trains is at least S, so that the time required to generate the evaluative functions can be reduced to 1/S according to the present invention as compared with the prior art. Since the value of S is normally 10 and may be as large as 100, the rangefinding time according to the present invention is reduced by at least 1/10. The time required to determine the optimum shifted value is not much greater than the time required to the generate evaluative signals in series if the circuits are properly arranged.

Then a range signal representing the distance to an object is generated by a range signal generating circuit based on the optimum shift number thus determined and apparatus utilizing the range signal, for example, selected portions of optical equipment such as focusing mechanisms for objective lenses, or moving vehicles or alarms or the like, are thereby controlled and regulated. According to the present invention the control circuits for effecting such control and regulation, for instance, microcomputer circuits, are separated from the circuit devices relating to the rangefinding function. In other words, the evaluative signal generating circuits and optimum shift value decision circuits which are the minimum necessary for effecting rangefinding quickly are contained in a first circuit device, for instance in a circuit device in the form of an integrated semiconductor chip. The control circuits should be adapted to the function inherent in the requirements of equipment utilizing the range signal and, accordingly, are contained in a second circuit device separated from the first circuit device, for instance, a microcomputer. By distributing the main circuits into two appropriate portions, it is possible to shorten the rangefinding time to a great extent on the one hand, and on the other hand to provide a proper control circuit for specific equipment utilizing the range signal in an economic manner.

The optical sensor arrays for receiving the image of an object are desirably contained in the first circuit device and are integrated on a semiconductor chip together with the other circuits. However, when CCD devices or CTD devices are employed in place of the arrays, it will be appropriate to provide the devices in a container separated from the first circuit device. Moreover, a range signal computing circuit for generating the range signal from the optimum shift number is preferably contained in the second circuit device to allow the microcomputer to effect operations when the range signal is obtained by computing the distance d to the object based on equation (1) from the optimum shift number. When the optimum shift number itself can be utilized as the range signal, however, it is advantageous to include the arrays in the first circuit device and integrate them on, for instance, a semiconductor chip.

DESCRIPTION OF PREFERRED EMBODIMENT

Figure 1:
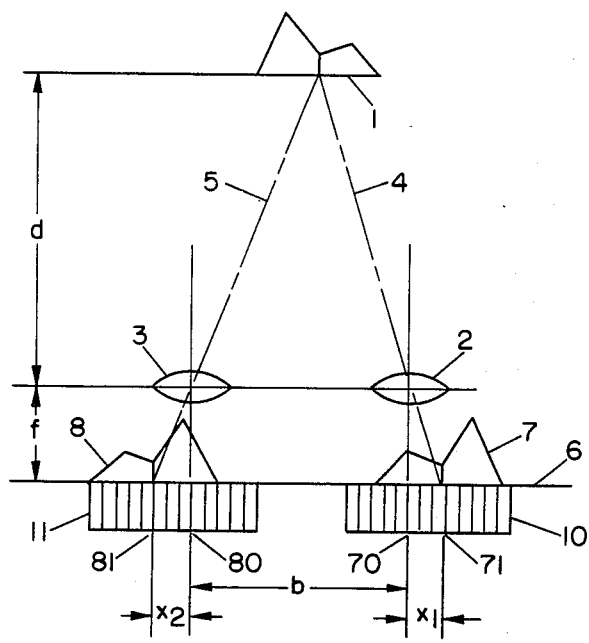
FIG. 1 is a schematic diagram illustrating the measuring principle of a rangefinder embodying the present invention.
Figure 2:
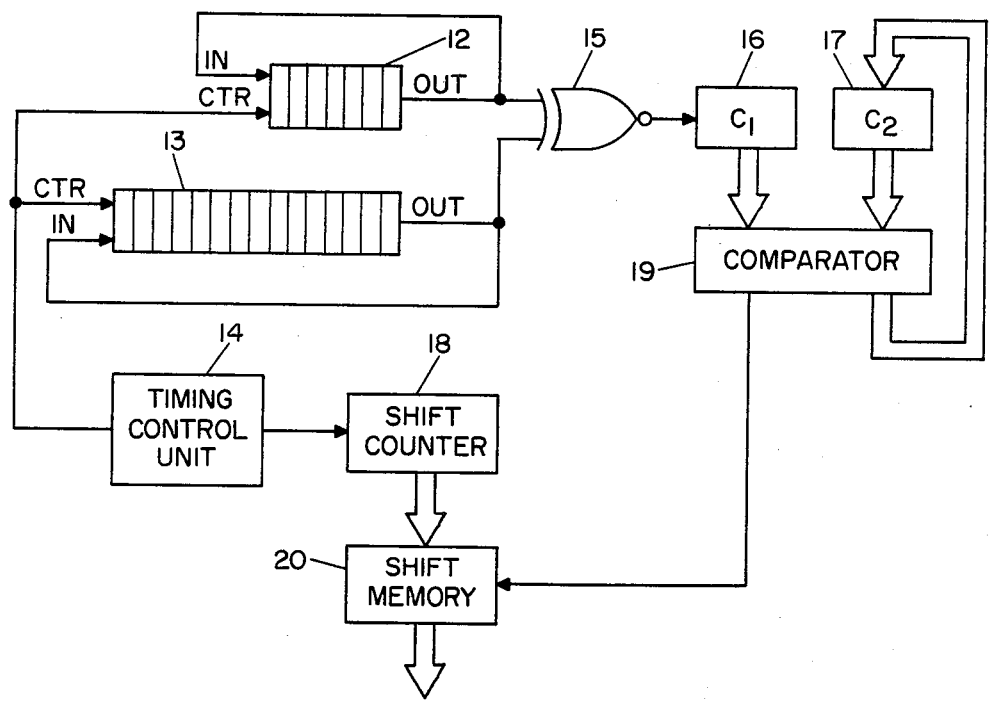
FIG. 2 is a schematic circuit diagram illustrating the operation of the circuit in a conventional rangefinder.
Figure 3:
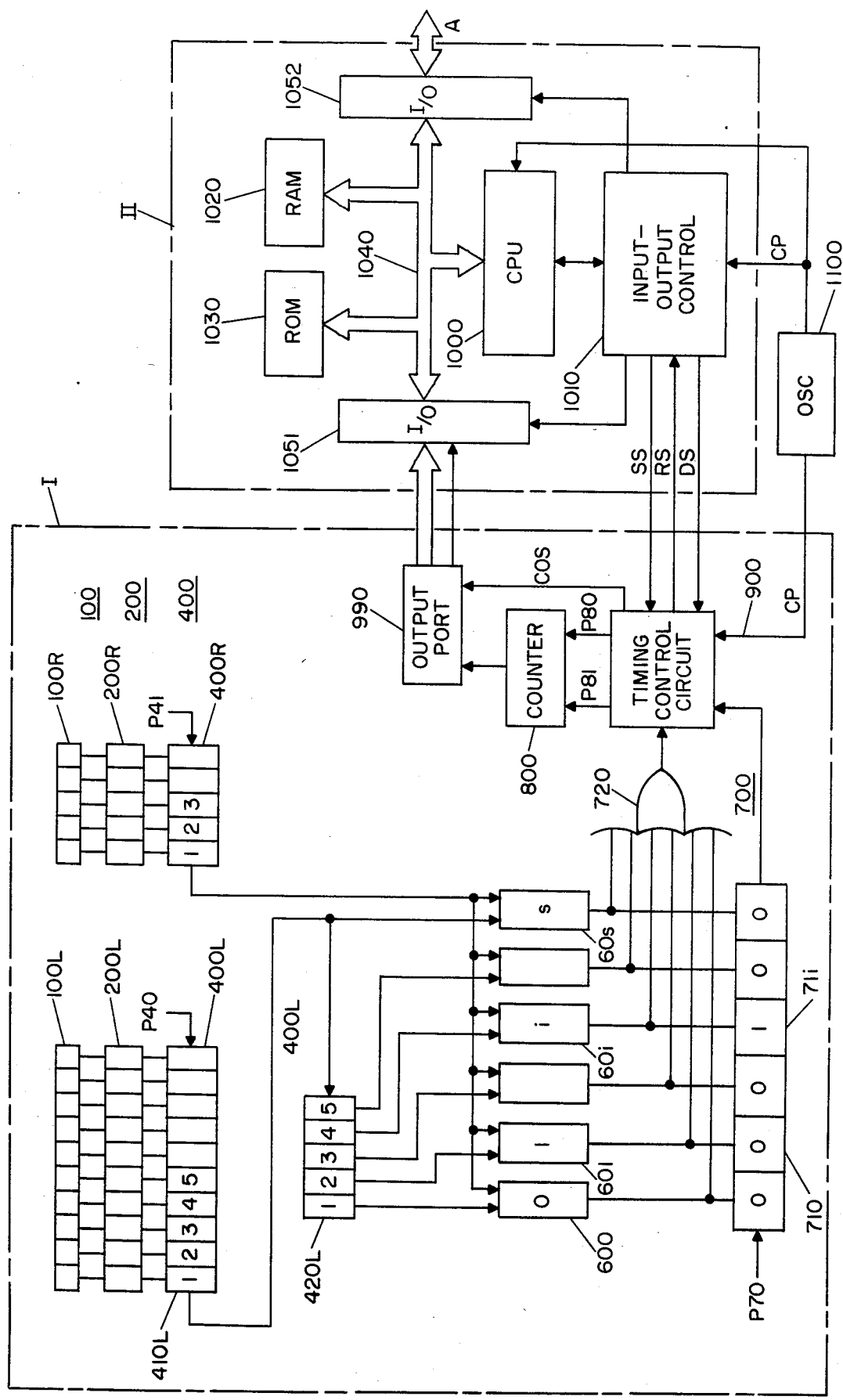
FIG. 3 is a schematic circuit diagram illustrating the general arrangement of a representative rangefinder embodying the present invention.

In the general circuit diagram of an embodiment of the present invention shown in FIG. 3, a first circuit device I and a second circuit device II are shown by alternate long and short dash lines enclosing the devices, respectively. In the upper portion of the first circuit device I are a pair of optical sensor arrays 100L and 100R, corresponding to the optical sensor arrays 10 and 11 of FIG. 1. These optical sensor arrays 100L and 100R each comprise a plurality of photodiodes arranged in a row. However, the optical sensor arrays may be other types of known arrays, for instance, CCD devices or CTD devices. The image used for rangefinding is formed by means of an optical system (not shown in FIG. 3) on the light receiving surface of each of these optical sensors. An image signal converter assembly 200, comprising two groups of converters 200L and 200R, is located just below a light receiving assembly comprising both the optical sensor arrays 100L and 100R and the groups of converters 200L and 200R have the same number of converters, for instance, analog/-digital converters (hereinafter called "ADC") as the number of optical sensors in the corresponding optical sensor arrays. The ADC operate to quantize an image signal having the analog value generated by the corresponding sensor and to convert the signal into digital image data. Although the image data are one-bit data having a logical value of "0" or "1" in a simple case, they may consist of any number of bits if required for more accurate rangefinding by providing a more precise interrelation between the image data trains. An example using one-bit data is shown in FIG. 3 to simplify the description.

Just below the image signal converter assembly 200 is an image register assembly 400 for storing the image data, the image register assembly 400 comprising two shift registers 400L and 400R for receiving image data in parallel from the converters 200L and 200R, respectively. However, the lefthand shift register 400L comprises, as mentioned above, a first shift register 410L for receiving the parallel image signals given by the groups of converters 200L, and a second shift register 420L for receiving the serial image data produced by the first register 410L. The righthand register 400R receives the parallel image data from the group of converters and sends serial image data to a group of evaluative signal generating circuits which will be described later. However, these shift registers 400L and 400R need not necessarily receive the parallel image data from the groups of converters 200L and 200R at all times and, particularly when CCD devices of the serial output type are used as the optical sensor arrays 100L and 100R, each array is equipped with an ADC as a converter, so that the image data output signals may be sent to the lefthand and righthand shift registers 400L and 400R serially. In any case, image data trains representing the distributions of luminous intensity in the images received by the optical sensor arrays 100L and 100R are stored in both the shift registers 400L and 400R in the same order as that of the arrangement of the optical sensors.

When the image data signal trains are caused to be generated by the shift registers 400L and 400R, a shift pulse P40, generated by a timing control circuit 900 shown on the lower side of the drawing, is applied to the stage at the right hand end of the lefthand first shift register 410L. The numbers shown in the stages of the shift register 410L correspond to the positions of the image elements and, each time one shift pulse 40 is given, the image signals are respectively shifted from right to left in the register 410L and the first image signal followed by the rest one at a time is serially shifted from the first register 410L to the second shift register 420L. When the first image signal which was initially stored in the leftmost stage of the first shift register 410L reaches the leftmost stage of the second shift register 420L as shown in FIG. 3 as a result of successive shift pulses P40, a shift pulse P41 is sent by the timing control circuit 900 synchronously with the next shift pulse P40 to the rightmost stage of the right-hand shift register 400R. Although the lefthand second shift register 420L in FIG. 3 has five stages, that register normally comprises s stages and is so arranged that a parallel output is generated by each stage. When the shift pulses P40 and P41 are produced synchronously s elements of parallel image data signals from the lefthand second shift register and one serial image data signal from the righthand shift register 400R are applied to a group of evaluative signal generating circuits 600-60s. Since the pulse transferred from the lefthand first shift register 410L to the second shift register 420L can also be used as an image data output signal, s+1 image data signals are sent by the lefthand shift register 400L to the group of evaluative signal generating circuits 600-60s.

Figure 4:
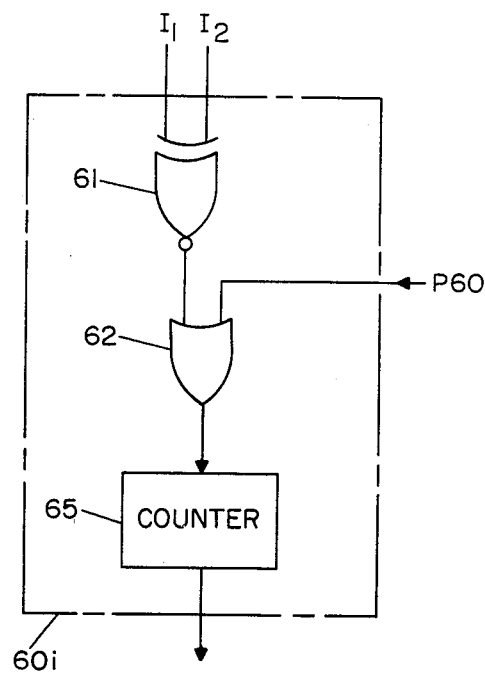
FIG. 4 is a schematic partial view illustrating the details of the weighting function generating circuit shown in the diagram of FIG. 3.

There are s+1 evaluative signal generating circuits 60i (i=0-s), and, as shown in FIG. 4 each of them comprises an exclusive NOR gate 61, an OR gate 62 and a counter 65 in the illustrated example. Among those elements, the exclusive NOR gate 61 is a logic gate for defining the relative relation between the left and right image data signal trains and one of the inputs $I_1$ and $I_2$ to each NOR gate is, as shown in FIG. 3, from the lefthand second shift register 420L, while the other receives the serial image data output from the righthand shift register 400R.

Referring to the leftmost evaluative signal generating circuit 600, when the synchronous shift pulses P40 and P41 are about to be given to the right and left shift registers 400L and 400R, respectively, at the beginning of the operation, the circuit 600 receives the first image data signal in the left image data train from the lefthand second shift register 420L and the first image data signal in the right image data train from the right shift register 400R. The exclusive NOR gate 61 of the circuit 600 generates a logical "1" signal only when both the image data coincide with each other and the signal opens the OR gate 62 and then adds 1 to the counter 65. The counter 65 of each of the evaluative signal generating circuits 600-60s is reset or cleared immediately before the shift pulses P40 and P41 are applied to the shift registers 400L and 400R so that the counter is set at 0. When the next shift pulses P40 and P41 are applied, the exclusive NOR gate 61 of the evaluative signal generating circuit 600 similarly receives the second image data signals in the left and right image data trains and compares them to determine whether they coincide and adds a "1" to the counter 65 only when they conform to each other.

While receiving image data from the left and right shift registers 400L and 400R in this same manner, the evaluative signal generating circuit 600 generally repeats the determination of whether the left and right image data signals agree with each other m times and causes the counter 65 to store the number of times in which both the data signals coincide out of the m times. Obviously, the evaluative signal generating circuit 600 always detects image data signals having the same numbers in the left and right image data trains; in other words, the circuit 600 is comparing the left and right image data trains. The number of shifts increases sequentially and the rightmost evaluative signal generating circuit 60s comprises the left and right image data trains at the shift number s of the data trains, which is indicated in the frame of the circuit 60s. While the synchronous shift pulses P40 and P41 are applied m times, the left and right image data trains are compared by the evaluative signal generating circuits 600-60s simultaneously in parallel so that the trains have been shifted by 0-s stages and s+1 evaluative signals as the result of comparisons are stored in the counter 65 of each of the evaluative signal generating circuits 600-60s.

The exclusive NOR gate as a logic circuit elelment for evaluation has been used by way of example to describe the operation of the above-mentioned evaluative signal generating circuit. However, the form of the logic circuit for defining the interrelation between the left and right image data trains is not necessarily limited to an exclusive NOR gate and, particularly when each image data signal comprises multiple bits, various known logic elements may be employed to define the interrelation between the image data trains. Needless to say, the counter 65 in each of the evaluative signal generating circuits should in that case be so arranged as to store the evaluative signal defining the interrelation between the image data trains.

Since the counter 65 in each of the evaluative signal generating circuits 600-60s is allowed to store the evaluative signal resulting from simultaneously defining the parallel interrelation between the left and right image data trains in s+1 cases within the range of the shift number 0 to s, an optimum delay indicating the highest correlation is determined by an optimum delay value decision circuit 700 including a shift register 700 and an OR gate 720 shown in the lower portion of the first circuit device I in FIG. 3. For this reason, a reading pulse P60 is first sent by a timing control circuit 900 to the OR gate 62 of FIG. 4 in each of the evaluative signal generating circuits 600-60s simultaneously and repeatedly. The OR gate 62 is opened each time the reading pulse is P60 is given once and a 1 is simultaneously added to each counter 65. When the reading pulse 60 is repeatedly given, the counter 65, for instance the counter in the evaluative function generating circuit 60i that has stored the maximum count value, causes an overflow and generates a carry signal, that is, the logic output "1".

Since the shift register 710 is provided with s+1 stages corresponding to the evaluative signal generating circuits 600-60s and each stage is arranged so as to receive the carry signals in parallel, as mentioned above and shown in FIG. 4, the logic output value "1" is stored in the stage of the shift register 710 corresponding to the evaluative signal generating circuit 60i. On the other hand, since the OR gate 720 has received the parallel carry signals from the evaluative signal generating circuits 600-60s, if any carry signal is given by an evaluative signal generating circuit, the gate will open and so inform the timing control circuit 900. Upon receipt of the open gate information, the timing control circuit 900 immediately stops sending the reading pulse P40 to the counter 65 in each of the evaluative signal generating circuits and consequently each counter 65 also stops counting; that is, no further carry signal is generated. As a result, only the stage of the shift register 710 corresponding to the evaluative signal generating circuit 60i that has stored the maximum count value will store the logic value "1" as shown in FIG. 3 and, accordingly, the shift number corresponding to the highest correlation between the left and right image data trains is determined.

In the illustrated embodiment, part of a range signal computing circuit comprises a simple counter circuit 800 contained in the first circuit device I which operates to read out and define the stage number of the logical value "1" stored in the shift register 710 in the above described optimum value decision circuit 700 as a range signal. The counter circuit 800 is arranged as a down counter circuit and, prior to reading, it is set at the maximum shift number s at which the evaluative signal generating circuits 600-60s may define the interrelation between the left and right image data trains under the instructions given by the timing control circuit 900. Then a shift pulse P70 is repeatedly sent by the timing cntrol circuit 900 to the shift register 710 and a down count pulse P80, synchronous with the pulse P70, is also repeatedly applied by the timing control circuit 900 to the down counter circuit 800. Both the pulses P70 and P80 are repeatedly applied until the logical value "1" is generated by the shift register 710 and 1 is subtracted from the count value in the down counter circuit 800 at that time. However, as the logical value "1" in the stage 70i corresponding to the above evaluative function generating circuit 60i is successively shifted from left to right by the shift pulse P70 and sent out of the rightmost stage, the timing control circuit 900 immediately stops sending both the pulses P70 and P80 on receiving the logic value. As a result, count value reduction in the down counter circuit 800 also stops at that point of time and the stage number i of the stage 70i of the shift register 710 that has stored the logic value "1" is finally stored as a count value in the down counter circuit 800.

To obtain the distance d of an object from an optimum shift number i, i must be multiplied by the pitch $x_o$ between the optical sensors of the optical sensor arrays 100L and 100R to compute the amount of the delay x from $x = i \cdot x_o$ and the predetermined calculation based on the equation $d = f \cdot b / x$ must also be carried out. These calculations are all carried out in the second circuit device II in this embodiment.

As shown in FIG. 3, the second circuit device II according to the present invention is a microcomputer equipped with a central processing unit (hereinafter called "CPU") 1000 and the microcomputer functions as a range signal computing circuit and is also responsible for controlling a built-in rangefinder or a device utilizing the range signal generated thereby, for instance, automatic focusing and aperture control devices of optical equipment such as a camera. The second circuit device II comprises, as shown in FIG. 3, the CPU 1000, an input/output control 1010, and a random access memory (RAM) 1020, a read-only memory (ROM) 1030, an input port 1051, and an input/output port 1052 all connected to the CPU 1000 through a data bus 1040. The ROM 1030 stores programs for operating the microcomputer as the second circuit device and in addition stores other necessary constants, such as the above-described base length b, focal length f, pitch $x_o$ between the optical sensors, etc. The second circuit device is also arranged so that these basic values will be prevented from being erased even if the power supply thereto is interrupted.

The RAM 1030 stores the shift number i as the variable received from the first circuit device I through the input port 1051, and also receives through the data bus 1040 the range d which CPU 1000 has computed according to the program stored in ROM 1030 and the equation (1) by reading the variable i and the above-mentioned constants stored in ROM 1030. A clock pulse generator 1100 is attached to both the first and second circuit devices and, by sending a clock pulse CP for use common to both the circuit devices to CPU 1000 of the second circuit device, the input/output control 1010 and the timing control circuit 900 for the first circuit device, it enables both circuit devices to operate synchronously with the same clock pulse.

When the rangefinder embodying the present invention is started, a start command ss is given by the input/output control of the second circuit device to the timing control circuit 900 of the first circuit device. Based on the start command, the timing control circuit 900 sends the shift pulses P40 and P41 to the left and right shift registers 440L and 400R, causing a series of circuit operations to be effected in the first circuit device to obtain the optimum shift number i as mentioned above. The shift number i is stored in the counter 800 as part of the range computing circuit means and at the same time the timing control circuit 900 sends a response signal RS indicating the production of the shift signal i to the input/output control 1010 of the second circuit device. Upon receipt of the signal, the input/output control 1010 generates, at a proper time in view of the operational sequence of the microcomputer, a signal DS demanding the transmission of the shift number i to the timing control circuit of the first circuit device and also controls its input port 1051 within its own circuit device to let the input gate open.

Figure 5:
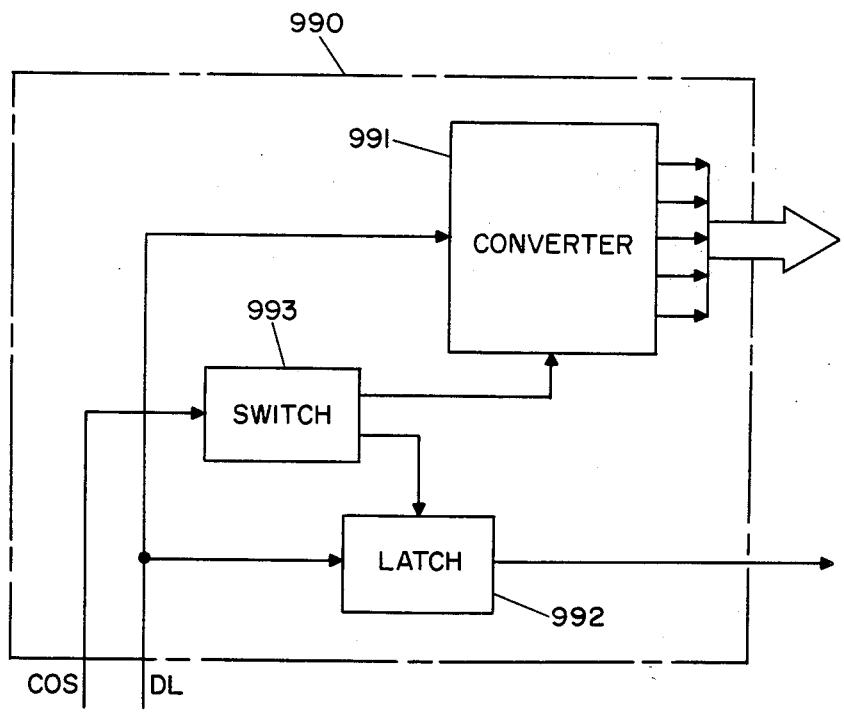
FIG. 5 is a schematic partial view illustrating the details of an output device in the circuit of FIG. 3.

On the other hand, the timing control circuit 900 in the first circuit device sends a switching signal COS for determining the output form of the shift number i to the output port 990 provided in the circuit device and subsequently a data transmission pulse P81 commanding the data transmission to the counter 800. As shown in FIG. 5, an output port 990 includes a serial/parallel converter 991 for converting a serial signal indicating the shift number i given by the counter 800 into one having multiple parallel bits, a latch circuit 992 for temporarily storing the serial signal and a switch circuit 993 operating to control the operational change of both the circuits. The switch circuit 993 on receiving the switching signal COS, enables the serial/parallel converter circuit 991 or latch circuit 992 to receive the data signal given by the counter 800 through a data line DL and representing the shift number i.

The output port 990 is arranged so as to be able to deal with both parallel and serial transmission methods depending on the devices, some of which are equipped with rangefinders capable of transmitting and receiving range signals such as a shift number i between the first and second circuit devices. On the other hand, a signal representing the shift number i in the form of parallel multiple bits can be transmitted from the counter 800 to the output port 990 and, in this case, it will suffice to show that the converter 991 within the output port 900 and the latch 992 are arranged as a latch circuit. The signal from the latch circuit is sent to a portion in the device utilizing the range signal, for instance, a focusing mechanism in the case of a camera and is used as a signal for displaying a range within the finder of the camera or adjusting the position of an objective lens for focusing. The starting command SS, response signal RS, demand signal DS and signals from the timing control circuit 900 in the first circuit device I are transmitted and received through the input/output port 1052.

By separating the second circuit device including computing, controlling and regulating circuit portions, from the first circuit device which determines the shift number within a short time, in accordance with the invention, the first circuit device can be used to deal with various different types of equipment utilizing rangefinding means. As a result, rangefinders may be manufactured less expensively and to satisfy specific user specifications. If required the first circuit can be contained in one semiconductor chip including optical sensor arrays and, consequently, it is possible to mass produce the rangefinder embodying the present invention. This not only improves the performance of the rangefinder but also contributes to practical and widespread use of rangefinders of this type.

We claim:

1. A rangefinder comprising a pair of optical sensor arrays, each sensor array having a plurality of optical sensors for receiving light from an object through spaced light paths and generating signal trains representing the distribution of light intensity of a corresponding image of the object, a plurality of evaluative signals generating circuits for combining both signal trains from the optical sensor arrays in a manner so that the signal trains are delayed by a number corresponding to a number of optical sensors in the arrays and for generating signals in parallel representing the correlation between both the signal trains at the delay intervals, an optimum delay decision circuit for determining an optimum delay corresponding to the highest correlation between both the signal trains among the plurality of the evaluative signals, range signal computing circuit means for computing a range signal representing the range of the object from the optimum decision circuit output delay, and control circuit means responsive to the range signal for controlling a selected portion of a device for utilizing the range signal wherein the evaluative signal generating circuits and the optimum delay decision circuit are incorporated in a first circuit device, and the control circuit means is incorporated in a second circuit device arranged separately from the first circuit device, the first circuit device being responsive to a command from the second circuit device to initiate a range determination and to transmit a range signal after determining the optimum delay.

2. A rangefinder according to claim 1 wherein the first circuit device is arranged so as to transmit an optimum delay signal in bth serial and parallel forms to the second circuit device.

3. A rangefinder according to claim 1 wherein the first circuit device is arranged to transmit a signal to the second circuit device when the first circuit device has determined the optimum delay and to transmit a signal representing the optimum delay upon receipt of a signal from said second circuit device.

4. A rangefinder according to claim 1 wherein the first and second circuit devices are controlled by a common reference clock pulse device.

5. A rangefinder according to claim 1 wherein the signal trains generated by the pair of sensor arrays are applied in parallel to the plurality of evaluative signal generating circuits.

6. A rangefinder according to claim 1 wherein the plurality of evaluating signal generating circuits simultaneously generate a plurality of evaluative signals in parallel.

7. A rangefinder according to claim 1 wherein the second circuit device comprises a microcomputer.

* * * * *